US012067068B1

(12) United States Patent
Margolin (10) Patent No.: US 12,067,068 B1
(45) Date of Patent: Aug. 20, 2024

(54) DATA RETRIEVAL USING MACHINE LEARNING

(71) Applicant: INTUIT INC., Mountain View, CA (US)

(72) Inventor: Itay Margolin, Petah Tikva (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/309,512

(22) Filed: Apr. 28, 2023

(51) Int. Cl.
*G06F 16/00* (2019.01)
*G06F 16/954* (2019.01)

(52) U.S. Cl.
CPC .................. *G06F 16/954* (2019.01)

(58) Field of Classification Search
CPC .................................... G06F 16/954
See application file for complete search history.

(56) References Cited

U.S. PATENT DOCUMENTS

| | | | | |
|---|---|---|---|---|
| 2016/0350651 A1* | 12/2016 | Devarajan | ............... | G06N 3/08 |
| 2020/0234134 A1* | 7/2020 | Choque | ................. | G06N 20/00 |
| 2020/0410157 A1* | 12/2020 | van De Kerkhof | ... | G06F 40/166 |
| 2022/0198254 A1* | 6/2022 | Dalli | ....... | G06N 5/025 |
| 2023/0037759 A1* | 2/2023 | Flynn | ..................... | G06F 18/217 |
| 2023/0095006 A1* | 3/2023 | Riva | ..................... | G06F 3/0483 |
| | | | | 715/762 |

OTHER PUBLICATIONS

Yunlong Dong, Variance aware reward smoothing for deep reinforcement learning, Oct. 2021, journal homepage: www.elsevier.com/locate/neucom, vol. 458, Oct. 11, 2021, pp. 327-335 (https://doi.org/10.1016/j.neucom.2021.06.014) (Year: 2021).*
Yunlong Dong et al, Variance aware reward smoothing for deep reinforcement learning, vol. 458, Oct. 11, 2021, pp. 327-335 https://doi.org/10.1016/j.neucom.2021.06.014 (Year: 2021).*
Yuexiang Zhai, Computational Benefits of Intermediate Rewards for Goal-Reaching Policy Learning, (Mar. 13, 2022), Journal of Artificial Intelligence Research 73 (2022) 847-896 (Year: 2022).*

* cited by examiner

*Primary Examiner* — Alex Gofman
*Assistant Examiner* — Suman Rajaputra
(74) *Attorney, Agent, or Firm* — Patterson + Sheridan LLP (57) ABSTRACT

The present disclosure provides techniques for data retrieval using machine learning. One example method includes receiving a plurality of training episodes associated with different environments, wherein each training episode of the plurality of training episodes includes a sequence of states, computing, based on the plurality of training episodes, total counts of a plurality of values in the states, initializing, for each state of the sequence of states in each training episode of the plurality of training episodes, a reward based on the total counts of the plurality of values, and training a reinforcement learning agent using the rewards.

11 Claims, 4 Drawing Sheets

DATA RETRIEVAL USING MACHINE LEARNING

Aspects of the present disclosure relate to data retrieval using machine learning.

In many software applications, users often need to enter data, such as transaction records, to perform various tasks. For example, in a software application used for accounting and tracking of expenses and income, a user may retrieve historical transaction records from various data sources (e.g., online sources such as webpages) and provide such records to the software application for further processing, such as performing analysis on aggregated records. In some cases, the data may be retrieved manually. However, manual retrieval of data may be time consuming, inaccurate, and prone to human errors. In other cases, data extraction methods, such as a data scraper, can be used to retrieve data. However, existing data extraction methods are not optimized for individual data sources and may miss where the data is located, omit essential records, or include irrelevant records.

To retrieve data conveniently and accurately, various search techniques can be used to determine where relevant data is located in a data source. Searches for locations of data in software applications are typically performed using search algorithms. Existing search algorithms may lack the prior knowledge about inherent structures of the data sources and hence may be inefficient. Further, search algorithms may not be optimized with respect to individual data sources, resulting in additional inefficiency.

Accordingly, improved systems and methods are needed for data retrieval.

BRIEF SUMMARY

Certain embodiments provide a method for data retrieval using machine learning. The method generally includes receiving a plurality of training episodes associated with different environments, wherein each training episode of the plurality of training episodes includes a sequence of states, computing, based on the plurality of training episodes, total counts of a plurality of values in the states, initializing, for each state of the sequence of states in each training episode of the plurality of training episodes, a reward based on the total counts of the plurality of values, and training a reinforcement learning agent using the rewards.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of the various embodiments.

BRIEF DESCRIPTION OF DRAWINGS

The appended FIGURES depict certain features of the various aspects described herein and are not to be considered limiting of the scope of this disclosure.

DETAILED DESCRIPTION

Aspects of the present disclosure provide apparatuses, methods, processing systems, and computer-readable mediums for data retrieval using machine learning.

Existing methods for retrieving data from data sources (e.g., webpages) often involve data scraping and searching. Records from a data source are often retrieved using data scraping tools and searches are then performed on the retrieved records to find relevant information that corresponds to the data needed. However, these existing methods are time consuming and require large storage space.

While conventional computer-based techniques for retrieving data from data sources are generally based on data scraping and searching, embodiments of the present disclosure utilize particular machine learning techniques to retrieve data.

Machine learning techniques, such as reinforcement learning, can be used to solve navigation programs where an agent needs to reach a goal from a starting point. Accordingly, retrieving data from data sources can be reformulated into a navigation problem, where the agent is required to locate the data in the data sources.

Reinforcement learning frameworks designed to solve navigation problems can be adapted to solve data retrieval problems. For example, a reinforcement learning model can be trained using episodes of historical navigations to data locations in data sources. One such training episode may include information about the sequence of states (e.g., webpages) in an environment (e.g., a website) navigated by a user to retrieve the desired data, and the sequence of actions (e.g., selections of user interface elements such as buttons) performed at each state. In general, performing an action (e.g., selecting a button) at a state allows transitioning from such state into a new state (e.g., transitioning from a webpage to a new webpage).

Similar to a navigation problem, the goal of a data retrieval scenario changes with the data retrieval environment (e.g., the website). However, unlike a navigation problem, a goal for a data retrieval scenario is generally not specified. For example, while the goal is known (e.g., as specified via coordinates) in a navigation problem, the goal in a data retrieval scenario may become known only after the goal is reached.

To handle navigation problems, reinforcement learning models are often trained with respect to rewards. A reward is a scalar signal generated from the environment that measures the performance of an agent with respect to the task goals. For a given state, the reward measures the effectiveness of taking a particular action. For navigation problems, the reward for each state is often associated with the distance of the state from the goal. The closer the state is to the goal, the higher the reward. However, since the goal is unknown in data retrieval problems, assigning distance-based rewards to states may not be appropriate. In fact, existing methods do not involve assigning or initializing intermediate rewards to intermediate states in data retrieval environments.

For data retrieval problems, a large reward may be initialized to the goal whereas smaller intermediate rewards may be initialized to states leading to the goal. Training a reinforcement learning model with no intermediate rewards can take a very long time for the reinforcement learning model to converge. In contrast, the intermediate rewards can help smooth the reward function, resulting in faster training for the reinforcement learning model. For example, the intermediate rewards can be assigned according to occurrences associated with values present in the state. The values can be predetermined.

To determine the intermediate rewards, values in the training episodes can be identified and counted. For example, a dictionary mapping the values to their respective counts in the episodes can be built. Intermediate rewards can be initialized (e.g., assigned) to intermediate states according to the values present in each state and the counts of the values. Details regarding building such a dictionary can be found below with respect to FIG. 1.

However, unlike navigation problems where the action space is fixed per state (e.g., the number of actions available to perform in each state is fixed), the data retrieval setting shows varying numbers of actions available per state (e.g., a varying number of buttons per webpage). To fit the data retrieval problem into the reinforcement learning framework, some actions available to perform in a state may be suppressed according to the associated rewards of the actions. For example, in a setting where only the actions with the top N rewards are considered, the actions that do not have the top N rewards may be disregarded. Details about suppressing actions can be found below with respect to FIG. 2.

Accordingly, by assigning intermediate rewards to intermediate states in training episodes, techniques described herein allow faster training of a reinforcement learning model designed to handle data retrieval scenarios, saving time and computational resources. As a result, the reinforcement learning model trained can accurately and efficiently retrieve data as requested by a user, unlike conventional reinforcement learning models, which are not designed or optimized for such a purpose. In addition, suppressing less helpful actions allows the reinforcement learning model to choose actions that are more likely to produce a positive outcome, thereby reducing processing time, improving the functioning of computing devices involved, and improving a user experience of related software applications.

Figure 1:
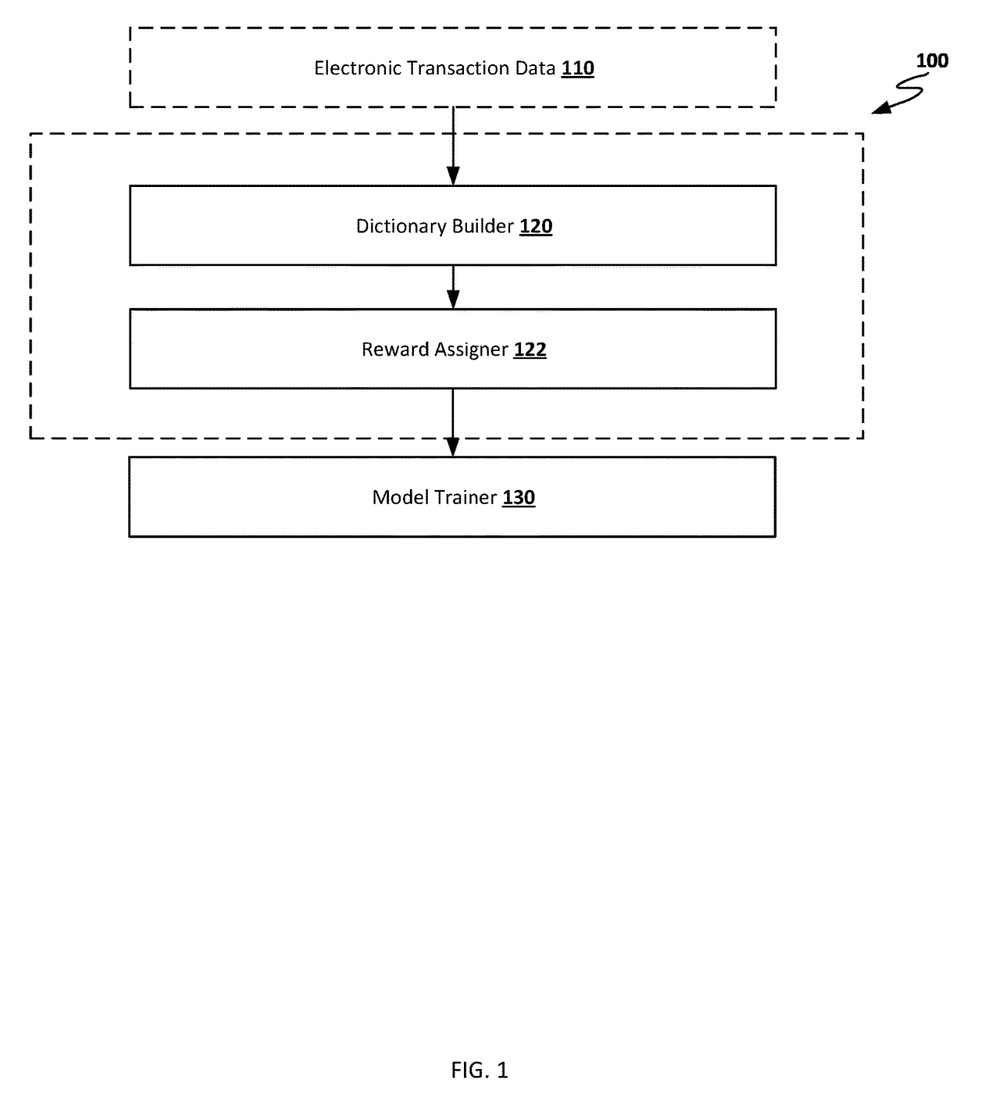
FIG. 1 depicts an example preprocessor for training a reinforcement learning agent to retrieve data.

Example Preprocessor for Training a Reinforcement Learning Agent to Retrieve Data FIG. 1 depicts an example preprocessor 100 for training a reinforcement learning agent to retrieve data.

Preprocessor 100 receives training episodes 110 as inputs and initializes (e.g., assigns) a reward (e.g., a numerical value) to every state in training episodes 110. Although discussed with respect to data retrieval environments involving online data sources, training episodes 110 can be collected from and indicate different types of environments, such as a graph search environment.

Training episodes 110 can indicate different but similar environments, such as data retrieval environments. Each training episode 110 can indicate a sequence of states (e.g., webpages) in an environment (e.g., a website) navigated by a user to retrieve the desired data, and the sequence of actions (e.g., buttons) performed at each state. In general, states visited in each training episode 110 other than the goal are called intermediate states (e.g., the start is also an intermediate state). In addition, performing an action (e.g., pressing a button) at a state allows transitioning from that state into a new state (e.g., transitioning from a webpage to a new webpage).

In some examples, the states are encoded using a neural network, such as a convolutional neural network (CNN) or Bidirectional Encoder Representations from Transformers (BERT).

Training episodes 110 can be provided as inputs to dictionary builder 120. Dictionary builder 120 can identify and count values in training episodes 110. The values may be specified based on the task to be performed and can be predetermined for each task. For example, dictionary builder 120 can select, based on a task to retrieve transaction data, a set of values appropriate for the transaction data retrieval task. In such examples, the values are keywords or encoded keywords indicating "welcome", "login", "transaction", "status" and so on. In some examples, additionally, the values indicate transaction codes associated with a specific type of transactions.

After determining the set of keywords, dictionary builder 120 can count each keyword in the training episodes 110. In some examples, training episodes 110 include 3 episodes. Following the example, episode 1 includes a first state indicating "welcome" and "login" and a second state indicating "transaction" and "status". Episode 2 includes a first state indicating "welcome" and "login", a second state indicating "login" and "status", and a third state indicating "transaction" and "status". Episode 3 includes a first state indicating "welcome" and "login" and a second state indicating "transaction". Accordingly, a dictionary can be built based on the count of the keywords in the 3 episodes, such as ["welcome": 3, "login": 4, "transaction": 3, "status": 3].

Information in the dictionary from dictionary builder 120 can be provided as inputs to reward assigner 122 to initialize (e.g., assign) rewards. Reward assigner 122 can assign a reward to each state in the environment indicated in each episode using the dictionary. For example, an intermediate state visited in a training episode 110 can be assigned an intermediate reward based on the count of the values present in the state. In contrast, a goal of a training episode 110 can be assigned an exponentially large reward (e.g., 999) relative to the intermediate rewards. States present in the environment of the training episode 110 but not visited may be assigned a reward of 0.

Following the example above, the first state of episode 2 may be assigned an intermediate reward representing the count of "welcome" (e.g., 3) and that of "login" (e.g., 4). The intermediate reward can be a sum of the counts (e.g., 7), a weighted some of the counts, a numerical value proportional to the counts, or the like. Accordingly, the third state of episode 2 may be assigned a large reward (e.g., 999) as it is the goal.

In some examples, alternatively, a negative reward (e.g. a penalty) is assigned to each intermediate state or each state not visited in a training episode 110, whereas a positive reward (e.g., 1) is only assigned to the goal. In such examples, the negative reward assigned to an intermediate state (e.g., −0.3) is discounted as compared to the negative reward assigned to an unvisited state (e.g., −1). The discount can be based on counts of values present in the intermediate state using the dictionary, in a similar manner to that discussed above.

Training episodes 110 with the associated rewards can be provided as inputs to model trainer 130 to train a reinforcement learning agent. In some examples, the reinforcement learning agent is trained to perform data retrieval tasks. The intermediate rewards assigned to the intermediate states can smooth the reward function and allow the reinforcement learning model to converge faster during training, saving time and computational resources. In some examples, additionally, the reward function is further smoothed using a filter function, such as Variance Aware Rewards Smoothing (VAR) or reward shaping. Additional details about the reinforcement learning model can be found below with respect to FIG. 2.

Example Scenario for Data Retrieval Using Machine Learning

Figure 2:
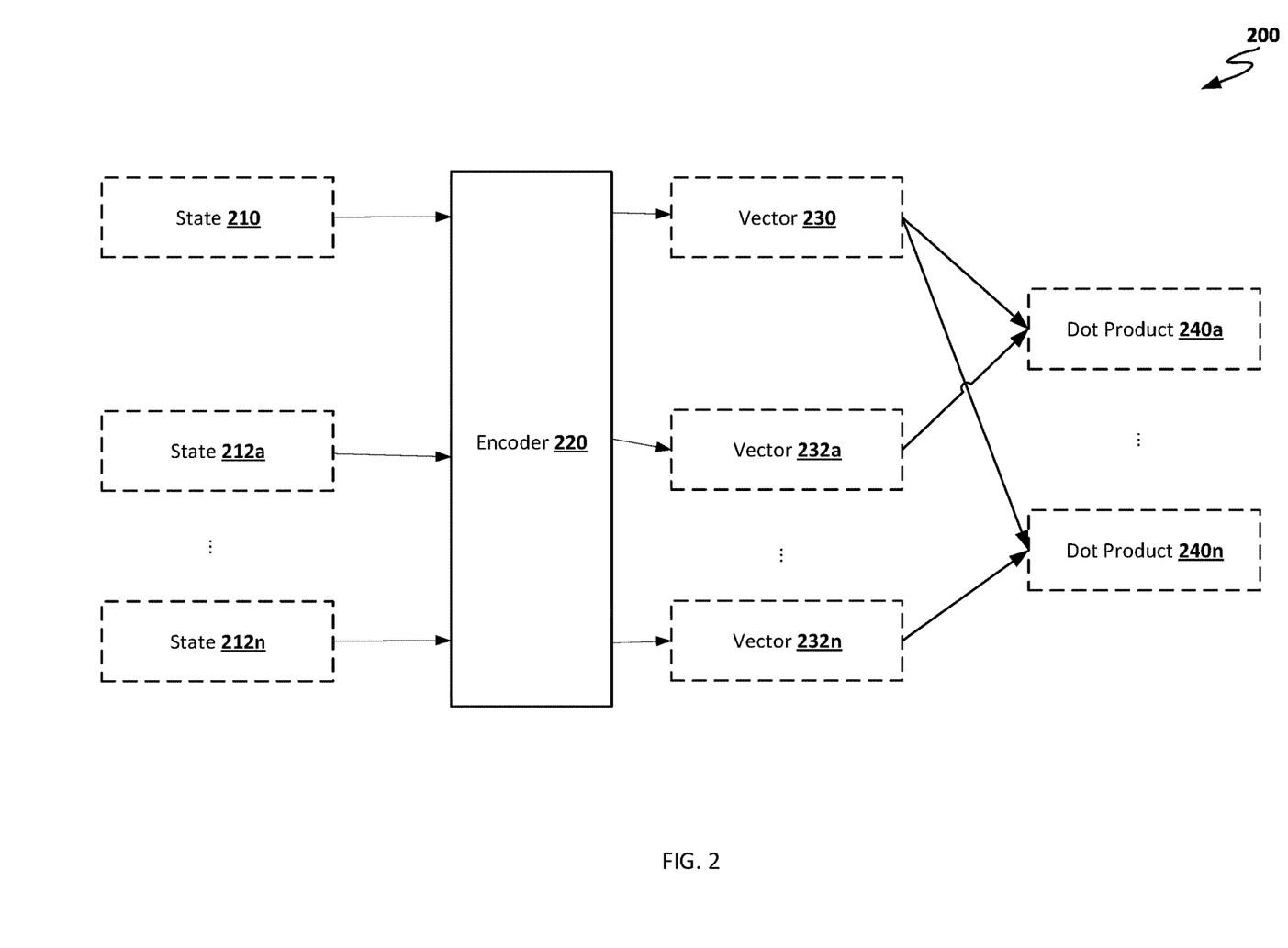
FIG. 2 depicts an example scenario for data retrieval using machine learning.

FIG. 2 depicts an example scenario 200 for data retrieval using machine learning. Although illustrated as performed by a specific reinforcement learning model, scenario 200 can be performed by any reinforcement learning framework, such as a Deep Q-Network (DQN) or Proximal Policy Optimization (PPO).

Scenario 200 receives as inputs state 210 and states 212a-n and generates an action as output. State 210 and states 212a-n can represent states in an environment, such as a data retrieval environment discussed with respect to FIG. 1. State 210 may transition to one of states 212a-n with an action. For example, state 210 represents a webpage in a website, and when a user presses a button in state 210, state 210 transitions another webpage represented by state 212a-n, in a similar manner to that discussed above with respect to FIG. 1. For simplicity, in the following discussion, action A (not illustrated) makes state 210 transition to state 212a, action B (not illustrated) makes state 210 transition to state 212b, and so on.

Encoder 220 can encode a state to generate an embedding vector of the state. For example, encoder 220 encodes state 210 into vector 230 and similarly, states 212a-n into vectors 232a-n, respectively. In some examples, encoder 220 includes a neural network, such as a convolutional neural network (CNN) or Bidirectional Encoder Representations from Transformers (BERT). In some examples, the embedding vectors 230 and 232a-n indicate the rewards associated with state 210 and states 212a-n. For example, during training of the reinforcement learning model, encoder 220 can learn the reward associated with each state in an environment. Accordingly, encoder 220 encodes a state with its associated reward into the embedding vector.

With vector 230 corresponding to state 210 and vectors 232a-n corresponding to states 212a-n, respectively, a dot product 240a-n can be calculated between vector 230 and each of vectors 232a-n. Each dot product 240a-n may represent the value of transition from state 210 into each state 212a-n, which is the value of each action A-N. For simplicity, in the following discussion, dot products 240a-n are assumed to be descending, such that action A has the highest value (e.g., dot product 240a) while action N has the lowest value (e.g., dot product 240n).

However, in a data retrieval environment, varying numbers of actions are available per state. For example, in a data retrieval environment to retrieve transaction data located on a webpage of a website, a "welcome" page in the environment may have 20 buttons, whereas a "login" page may include 10 buttons. The varying number of actions per state may pose a challenge for the reinforcement learning agent, where existing reinforcement learning frameworks can only accommodate a fixed set of actions per state.

To adapt to the varying number of actions per state, and thereby overcome deficiencies of conventional reinforcement learning techniques with respect to data retrieval, a threshold number of actions may be specified to suppress certain actions. In one example, only a threshold number of actions with the highest values are considered, whereas the remaining actions are suppressed (e.g., ignored). Following the example above, if the threshold is 3, then only 3 actions with the top 3 dot products are considered, namely actions A-C, whereas the remaining actions D-N are suppressed. Suppressed actions may be ignored for the purposes of reward calculations.

In some examples, alternatively, if the number of actions available is below the threshold number, dummy actions are created to match the number of actions to the threshold number of actions. Each of the dummy actions may be remapped to a valid action (e.g., an action represented by a button on a webpage), such that the value corresponding to that valid action is duplicated for the dummy action.

In some examples, the threshold is predetermined. In some examples, the values (e.g., the dot products) of the suppressed actions are zeroed.

The values of the actions can be used to calculate likelihoods to choose actions. For example, the values of actions not suppressed can be normalized to calculate the likelihoods of choosing the actions. Following the example above, dot products 240a-c are normalized, where normalized dot product 240a represents the likelihood to choose action A, normalized dot product 240b represents the likelihood to choose action B, and normalized dot product 240c represents the likelihood to choose action C. The reinforcement learning agent can choose an action to perform from actions A-C based on the likelihoods. For simplicity, in the following discussion, action A is assumed to be chosen.

In some examples, a bandit algorithm can be used to encourage exploration of under-explored actions. The bandit algorithm can be one or more of upper confidence bound (UCB) bandit algorithm, epsilon-greedy algorithm, Thompson sampling, gradient-based algorithm, or contextual bandit algorithm. Following the example above, when evaluating actions A-C based on the normalized dot products 240a-c, the bandit algorithm can increase the likelihood of under-explored actions (e.g., actions not chosen previously), such that the under-explored actions will be more likely to be chosen.

Once an action is chosen and performed, the state transitions from state 210 into one of states 212a-n. Following the example, if action A is chosen and performed, the state transitions from state 210 to state 212a. If state 212a is the goal, data is retrieved from state 212a and the process terminates. However, if state 212a is not the goal, the reinforcement agent then evaluates state 212a and its associated states (e.g., states accessible from state 212a with an action performed on state 212a), similar to as discussed above. Notably, state 212a may have a different number of associated states from state 210 due to the difference in numbers of actions available, but the threshold discussed above helps account for the difference in action space per state. The process continues until the goal is found.

Suppressing actions with lower values can help eliminate more costly paths in the exploration process. For example, in a data retrieval environment, a "login" page may be more likely to lead to the goal than a "career" page. The trained reinforcement agent can learn the general characteristics of a type of environment (e.g., retrieving data from online websites) and is likely to place higher values (e.g., calculate higher dot products) on the states leading to the goal rather than states that are not as relevant. Accordingly, the reinforcement agent can focus on more promising paths, reach the goal faster, reduce wait time for the user and improve the user experience.

Figure 3:
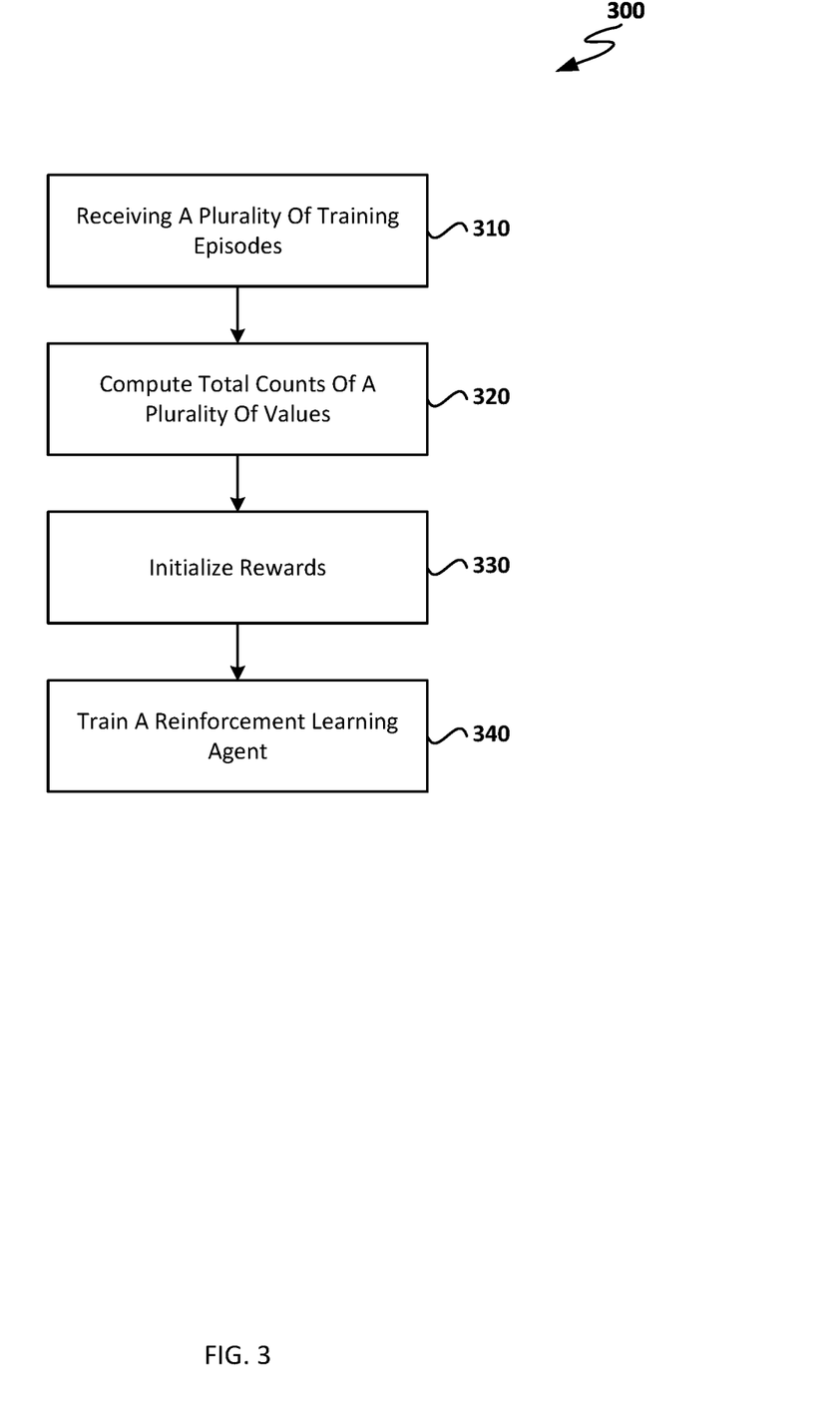
FIG. 3 is a flow diagram of example operations for preprocessing training episodes for data retrieval using machine learning.

Example Operations for Preprocessing Training Episodes for Data Retrieval Using Machine Learning FIG. 3 is a flow diagram of example operations 300 for preprocessing training episodes for data retrieval using machine learning. Operations 300 may be performed by a preprocessor, such as preprocessor 100 as illustrated in FIG. 1.

Operations 300 begin at 310, a plurality of training episodes is received associated with different environments, wherein each training episode of the plurality of training episodes includes a sequence of states. For example, the plurality of training episodes can be plurality of training episodes 110 illustrated in FIG. 1, whereas the different environments can be the data retrieval environments discussed with respect to FIG. 1.

In some embodiments, each state of the sequence of states in each training episode is encoded using a neural network. In such embodiments, the neural network includes a convolutional neural network (CNN) or Bidirectional Encoder Representations from Transformers (BERT).

At 320, total counts of a plurality of values in the states are computed based on the plurality of training episodes. For example, the values can be the values of the dictionary discussed with respect to FIG. 1, whereas total counts of values can be computed using dictionary builder 120 illustrated in FIG. 1.

At 330, a reward is initialized, for each state of the sequence of states in each training episode of the plurality of training episodes, based on the total counts of the plurality of values. For example, the reward can be computed by reward assigner 122 as illustrated in FIG. 1.

In some embodiment, initializing, for each state of the sequence of states in each training episode of the plurality of training episodes, a reward based on the total counts of the plurality of values comprises, for each training episode, for each state, identifying in the state a subset of values in the plurality of values, computing a sum of the total counts of the subset of values, assigning to the state, a reward value proportional to the sum. For example, the states are intermediate states and the reward assigner 122 can assign an intermediate reward to each intermediate state, as discussed with respect to FIG. 1.

In some embodiments, the rewards are smoothed using a filter function. For example, the filter function can be Variance Aware Rewards Smoothing (VAR) or reward shaping, as discussed with respect to FIG. 1.

At 340, a reinforcement learning agent is trained using the rewards. For example, the reinforcement learning agent can be trained using model trainer 130 as illustrated in FIG. 2.

Example Application Server

Figure 4:
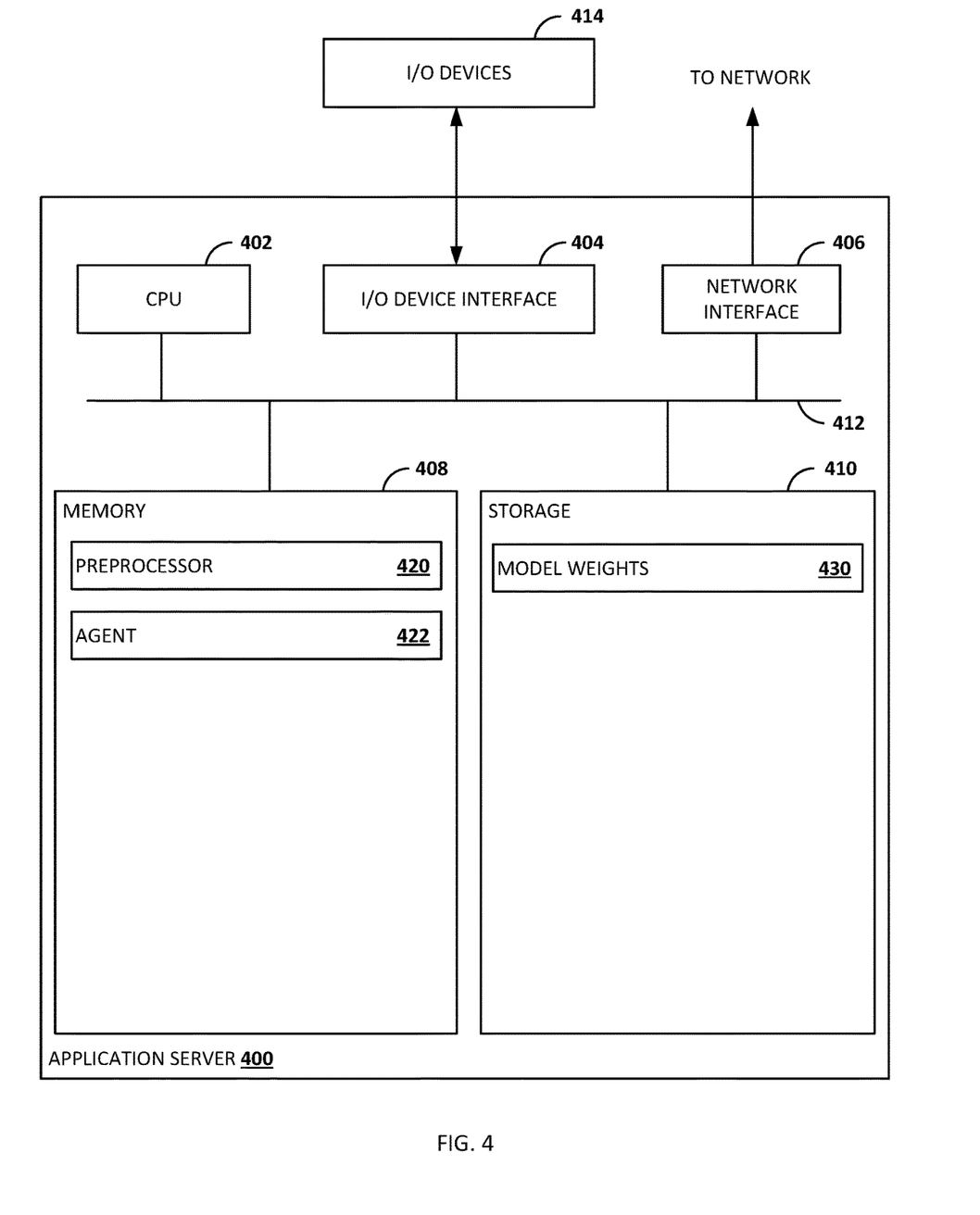
FIG. 4 depicts an example application server related to embodiments of the present disclosure.

FIG. 4 depicts an example application server 400, which can be used to deploy preprocessor 100 of FIG. 1 or the machine learning models as discussed with respect to FIGS. 1-2. As shown, application server 400 includes a central processing unit (CPU) 402, one or more input/output (I/O) device interfaces 404, which may allow for the connection of various I/O devices 414 (e.g., keyboards, displays, mouse devices, pen input, etc.) to application server 400, a network interface 406, a memory 408, a storage 410, and an interconnect 412.

CPU 402 may retrieve and execute programming instructions stored in memory 408. Similarly, CPU 402 may retrieve and store application data residing in memory 408. Interconnect 412 transmits programming instructions and application data, among CPU 402, I/O device interface 404, network interface 406, memory 408, and storage 410. CPU 402 is included to be representative of a single CPU, multiple CPUs, a single CPU having multiple processing cores, and the like. I/O device interface 404 may provide an interface for capturing data from one or more input devices integrated into or connected to application server 400, such as keyboards, mice, touchscreens, and so on. Memory 408 may represent a random access memory (RAM), while storage 410 may be a solid state drive, for example. Although shown as a single unit, storage 410 may be a combination of fixed and/or removable storage devices, such as fixed drives, removable memory cards, network attached storage (NAS), or cloud-based storage.

As shown, memory 408 includes preprocessor 420 and agent 422. Preprocessor 420 may be the same as or substantially similar to preprocessor 100 of FIG. 1. Agent 422 may be the same as or substantially similar to the reinforcement learning agent as discussed with respect with respect to FIGS. 1-2.

As shown, storage 410 includes model weights 430. Model weights 430 may be the same as or substantially similar to the weights of the reinforcement learning model discussed with respect to FIGS. 1-2.

It is noted that the components depicted in application server 400 are included as examples, and other types of computing components may be used to implement techniques described herein. For example, while memory 408 and storage 410 are depicted separately, components depicted within memory 408 and storage 410 may be stored in the same storage device or different storage devices associated with one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in FIGURES, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
receiving, at a dictionary builder, a plurality of training episodes associated with different environments, wherein each training episode of the plurality of training episodes includes a sequence of states;
identifying, by the dictionary builder, a set of dictionary values in the training episodes, the set of dictionary values being specified based on a task and being predetermined for the task;
computing, based on the plurality of training episodes, for each dictionary value of the set of dictionary values, a total count of the dictionary value in all states of the plurality of training episodes;
initializing a reward for each state in the sequence of states based on the dictionary values present in the state and, for each dictionary value from the set of dictionary values present in the state, a total count of the dictionary value in the sequence of states; and
training a reinforcement learning agent to retrieve requested data by providing the training episodes and the initialized reward for each state of the sequence of states as inputs to a reinforcement learning framework, wherein the training comprises:
using a reward function to learn intermediate rewards for intermediate states of the sequence of states based on the initialized reward for each state of the sequence of states, wherein the reward function is smoothed using a filter function; and
suppressing one or more actions available to perform in the state based on reward values determined using the reward function for the one or more actions such that the one or more actions are ignored for purposes of reward calculation.

2. The method of claim 1, further comprising encoding each state of the sequence of states in each training episode using a neural network.

3. The method of claim 2, wherein the neural network comprises one or more of a convolutional neural network (CNN) or Bidirectional Encoder Representations from Transformers (BERT).

4. The method of claim 1, wherein each dictionary value of the set of dictionary values comprises a keyword and a count of the keyword in one or more training episodes.

5. The method of claim 4, wherein the keyword comprises a transaction code associated with a transaction or a selection from: "welcome," "login," "transaction," or "status".

6. A system, comprising:
a memory including computer executable instructions; and
a processor configured to execute the computer executable instructions and cause the system to:
receive a plurality of training episodes associated with different environments, wherein each training episode of the plurality of training episodes includes a sequence of states;
compute, based on the plurality of training episodes, total counts of a plurality of values in the states corresponding to a plurality of dictionary values of a dictionary;
initialize, for each state of the sequence of states in each training episode of the plurality of training episodes, a reward based on the dictionary and on the total counts of the plurality of dictionary values; and
train a reinforcement learning agent using the rewards;
receive, at a dictionary builder, a plurality of training episodes associated with different environments, wherein each training episode of the plurality of training episodes includes a sequence of states;
identify, by the dictionary builder, a set of dictionary values in the training episodes, the set of dictionary values being specified based on a task and being predetermined for the task;
compute, based on the plurality of training episodes, for each dictionary value of the set of dictionary values, a total count of the dictionary value in all states of the plurality of training episodes;
initialize a reward for each state in the sequence of states based on the dictionary values present in the state and, for each dictionary value from the set of dictionary values present in the state, a total count of the dictionary value in the sequence of states; and
train a reinforcement learning agent to retrieve requested data using by providing the training episodes and the initialized reward for each state of the sequence of states as inputs to a reinforcement learning framework, wherein the training comprises:
using a reward function to learn intermediate rewards for intermediate states of the sequence of states based on the initialized reward for each state of the sequence of states, wherein the reward function is smoothed using a filter function; and
suppressing one or more actions available to perform in the state based on reward values determined using the reward function for the one or more actions such that the one or more actions are ignored for purposes of reward calculation.

7. The system of claim 6, wherein the computer executable instructions further cause the system to encode each state of the sequence of states in each training episode using a neural network.

8. The system of claim 7, wherein the neural network comprises one or more of a convolutional neural network (CNN) or Bidirectional Encoder Representations from Transformers (BERT).

9. A non-transitory computer readable medium comprising instructions to be executed in a computer system, wherein the instructions when executed in the computer system perform a method on a computing device, comprising:
receiving, at a dictionary builder, a plurality of training episodes associated with different environments, wherein each training episode of the plurality of training episodes includes a sequence of states;
identifying, by the dictionary builder, a set of dictionary values in the training episodes, the set of dictionary values being specified based on a task and being predetermined for the task;
computing, based on the plurality of training episodes, for each dictionary value of the set of dictionary values, a total count of the dictionary value in all states of the plurality of training episodes;
initializing a reward for each state in the sequence of states based on the dictionary values present in the state and, for each dictionary value from the set of dictionary values present in the state, a total count of the dictionary value in the sequence of states; and
training a reinforcement learning agent to retrieve requested data by providing the training episodes and the initialized reward for each state of the sequence of states as inputs to a reinforcement learning framework, wherein the training comprises:

using a reward function to learn intermediate rewards for intermediate states of the sequence of states based on the initialized reward for each state of the sequence of states, wherein the reward function is smoothed using a filter function; and suppressing one or more actions available to perform in the state based on reward values determined using the reward function for the one or more actions such that the one or more actions are ignored for purposes of reward calculation.

10. The non-transitory computer readable medium of claim 9, wherein the method further comprises encoding each state of the sequence of states in each training episode using a neural network.

11. The non-transitory computer readable medium of claim 10, wherein the neural network comprises one or more of a convolutional neural network (CNN) or Bidirectional Encoder Representations from Transformers (BERT).

\* \* \* \* \*